L. J. VAN GUELPEN.
AIR COOLED TOOL.
APPLICATION FILED FEB. 15, 1917.
1,253,650.
Patented Jan. 15, 1918.
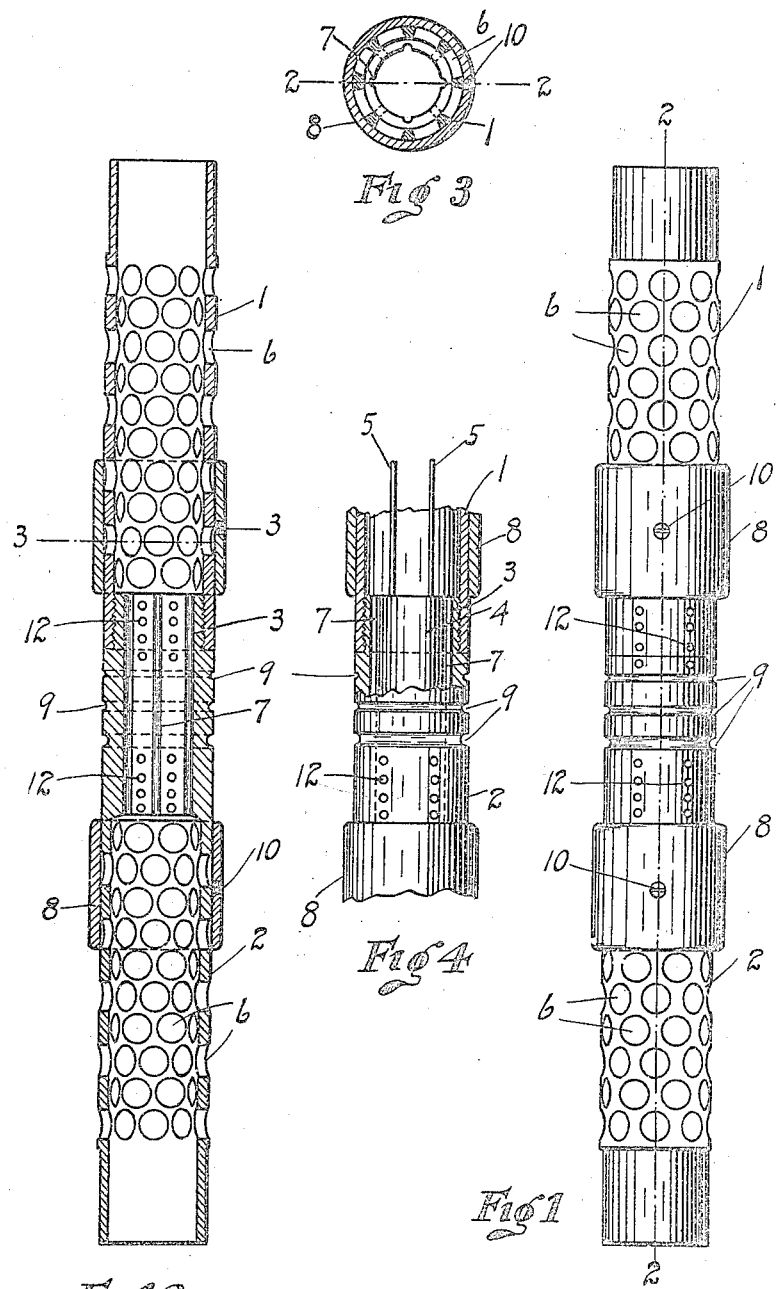

UNITED STATES PATENT OFFICE.

LOUIS J. VAN GUELPEN, OF CINCINNATI, OHIO.

AIR-COOLED TOOL.

1,253,650.            Specification of Letters Patent.    Patented Jan. 15, 1918.

Application filed February 15, 1917. Serial No. 148,920.

*To all whom it may concern:*

Be it known that I, LOUIS J. VAN GUELPEN, a citizen of the United States, residing at the city of Cincinnati, in the county of Hamilton and State of Ohio, have invented certain new and useful Improvements in Air-Cooled Tools, of which the following is a specification.

The object of my invention is to cool a heated tool or revolving spindle so that any work coming in contact therewith will not be scorched or burnt or improperly acted upon by reason of the intensity of the heat, and at the same time keep the bearings in which the tool or spindle is supported, from becoming overheated. I accomplish this by placing a multiplicity of holes in the tool or spindle so that the air can pass therethrough and keep the parts sufficiently cooled to work properly. I also provide means for cutting off some of the holes, if too much air is passing through the spindle and in this way increase the heat as desired. I may also place grooves at one point in the spindle on the inside.

One form or application of my improved air cooled tool is used in connection with burnishing machines for burnishing the edge of leather parts.

In the accompanying drawing forming part of this specification:

Figure 1, is a view in elevation of a tool or spindle involving my invention,

Fig. 2, is a central longitudinal section taken on line 2—2 of Fig. 1,

Fig. 3, is a cross section taken on line 3—3 of Fig. 2, and

Fig. 4, is a view in elevation of the spindle broken away to show the heating unit in elevation.

The tool or spindle which is revolved in bearings (not shown) and is heated, is made up, in the present instance, of a top part 1 and a lower part 2 screwed together at point 3. This tool may be supported, revolved and heated in any manner found expedient. These parts 1 and 2 are hollow except where the heating unit 4 is present, it filling the space provided for it. In the present instance this unit is heated by electricity, the wires 5 conducting the current to same. Through the upper and lower part of the spindle at the points shown I place holes or perforations 6. At the point where the heating unit 4 is present, I cut in the spindle, on the inside, a series of longitudinal grooves 7 (see particularly Figs. 2 and 3).

In order to cut off some of the holes when the heat is insufficient, I slide the thimbles or collars 8 to a point near the heating unit so that more heat will be carried to the grooves 9 in the spindle where the heating unit is present; of course they may be slid to any point on the spindle and are held in place by screws 10.

At the point where the heating unit 4 is present in the spindle, I preferably place small holes as 12.

In the spindle, at its periphery, at a point where the heating unit is present I place grooves 9, before referred to, where, in the present instance, the heat is applied to the material to be acted upon.

The holes or perforations may be of any shape or contour and of any size and may be greater or less in number, the object being to have the tool at the proper temperature where the grooves 9 are present and at the bearings.

The longitudinal grooves on the inside of the spindle, at the point where the heating unit is present, may be dispensed with if desired as may also the small perforations at this part of the spindle.

What I claim as new and my invention and desire to secure by Letters Patent is:

1. In an air cooled tool, a hollow spindle, and means to heat the spindle, said spindle being provided with a multiplicity of perforations therethrough for the purpose of allowing air to pass to cool the same.

2. In an air cooled tool, a hollow spindle, and means to heat the spindle, said spindle being provided with a multiplicity of perforations therethrough for the purpose of allowing air to pass to cool the same, and means for increasing or diminishing the intensity of the heat by cutting off or in certain sections of said perforations along the spindle.

3. In an air cooled tool, a hollow spindle, and means to heat the spindle, said spindle being provided with a multiplicity of perforations therethrough and at a given point provided with internal grooves for allowing the passage of air to keep said tool at the proper temperature.

4. In an air cooled tool, a hollow spindle, said spindle carrying a heating unit therein and provided with a multiplicity of perforations at the point where said heating unit is present.

5. In an air cooled tool, a hollow spindle, said spindle carrying a heating unit therein and provided with a multiplicity of perforations and internal grooves at the point where said heating unit is present.

Witness my hand at Cincinnati Ohio, February 8th, 1917.

LOUIS J. VAN GUELPEN.

Witnesses:
H. E. CARSTENS,
JOHN W. STREHLI.